Patented July 23, 1946

2,404,720

UNITED STATES PATENT OFFICE 2,404,720

POLYMER PRODUCTS

Ray Clyde Houtz, Snyder, N. Y., assignor to E. I. du Pont de Nemours & Company, Wilmington, Del., a corporation of Delaware No Drawing. Application November 4, 1944, Serial No. 562,018

10 Claims. (Cl. 260—32)

This invention relates to a new composition of matter and shaped articles produced therefrom. More particularly, this invention relates to an organic solvent solution of polyacrylonitrile, i. e. polymerized acrylonitrile or polymerized vinyl cyanide $(CH_2=CHCN)_x$, and copolymers and interpolymers of acrylonitrile in which at least 85% by weight of the polymer is acrylonitrile, and to the production of shaped articles from said organic solvent solution of said polymers of acrylonitrile.

This application is a continuation-in-part of the copending application of Ray Clyde Houtz, Serial No. 447,446, filed June 17, 1942.

Polyacrylonitrile, and copolymers and interpolymers of acrylonitrile with other polymerizable substances, for example vinyl or acrylic compounds, in which at least 85% by weight of the polymer is acrylonitrile have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts, numerous attempts have been made to form these polymeric materials into yarns, films and other shaped articles.

The copending application of George H. Latham, Serial No. 562,012, filed of even date herewith discloses solutions of polyacrylonitrile in dimethyl carbamyl compounds and the production of extruded and otherwise shaped articles and structures from such solutions. The abovesaid application of George H. Latham represents the first successful dissolution of polyacrylonitrile in a solvent to produce a solution which is suitable for the production of commercially useful textile yarns or wrapping tissue films and similar tough, flexible structures.

The present application relates to a similarly satisfactory dissolution of polyacrylonitrile in an organic solvent taken from a different class of organic compounds.

It is therefore an object of this invention to dissolve polyacrylonitrile, or a copolymer or interpolymer of acrylonitrile in which at least 85% by weight of the polymer is acrylonitrile, in a solvent which does not react with or decompose the polymer and which may be substantially completely removed from structures formed of such a solution.

It is another object of this invention to produce a solution of polyacrylonitrile, or a copolymer or interpolymer of acrylonitrile in which at least 85% by weight of the polymer is acrylonitrile, in a solvent which does not react with or decompose the polymer, the solution being suitable for the formation of commercially useful, substantially void free articles of polyacrylonitrile.

It is another object of this invention to produce a solution of polyacrylonitrile, or a copolymer or interpolymer of acrylonitrile in which at least 85% by weight of the polymer is acrylonitrile, in a volatile organic solvent, which solution is stable over extended periods of time at room temperature or elevated temperatures.

It is a further object of this invention to produce, from solution, polyacrylonitrile, or a copolymer or interpolymer of acrylonitrile in which at least 85% by weight of the polymer is acrylonitrile in its substantially undecomposed and chemically unchanged state.

It is still another object of this invention to produce, from solution, polyacrylonitrile, or a copolymer or interpolymer of acrylonitrile in which at least 85% by weight of the polymer is acrylonitrile which is tough, flexible, tenacious and free from voids.

Other objects of the invention will appear hereinafter.

The objects of the invention may be accomplished in general by dissolving polyacrylonitrile, or a copolymer or interpolymer of acrylonitrile in which at least 85% by weight of the polymer is acrylonitrile, in an aromatic diamino compound taken from the group consisting of:

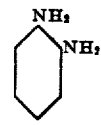

Ortho phenylene diamine

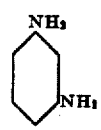

Meta phenylene diamine

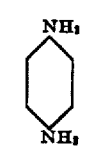

Para phenylene diamine

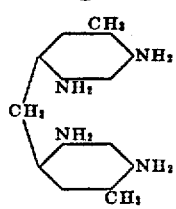

2,2',4,4'-tetramino 5,5'-dimethyl diphenyl methane

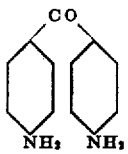

4,4'-diamino benzophenone

2,6-diamino pyridine

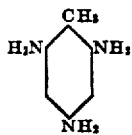

2,4,6-triamino toluene

These acrylonitrile solutions may be formed into a shaped structure and the aromatic diamino solvent removed from the so formed structure. The solvent may be removed by evaporation under vacuum, or it may be removed by leaching the solvent from the structure by means of a liquid, for example water, which will dissolve the solvent but which is inert to the acrylonitrile structure. If desired, a structure can be formed from the solution and a portion of the solvent retained in the structure as a plasticizer.

A number of the above-mentioned solvents become colored on exposure to air, especially at temperatures above their melting points. It is therefore desirable, if a substantially colorless product is required, to prepare the solutions and to form the structures therefrom while excluding oxidizing atmospheres. This may be done by forming the solutions and subsequently forming structures from the solutions in the presence of nitrogen gas.

The solutions are prepared by dissolving the polyacrylonitrile, or copolymer or interpolymer of acrylonitrile with one or a mixture of the above-mentioned solvents. These solvents are solid at ordinary temperatures and dissolve or retain the polymer in clear solution, sometimes only at elevated temperatures, for example at temperatures of 100° C. or higher, below which temperature the composition often resembles a gel. In all cases, when the polymer is dissolved in a solvent of the above class, the resulting composition while hot has the appearance of a true solution. When cooled to room temperature, the composition frequently takes on the appearance of a gel, which gel may on prolonged standing undergo syneresis. Reheating of this gel or synersed mass however causes it to again return to solution form.

In view of the relatively high melting points of some of the solvents of this invention, they are useful as solvent plasticizers for polyacrylonitrile. The present invention therefore contemplates solid solutions of acrylonitrile polymers containing at least 85% by weight of acrylonitrile as well as liquid solutions thereof.

Shaped articles obtained from solvent solutions of polyacrylonitrile in accordance with the invention and from which the solvent is subsequently removed are substantially free of foreign matter and voids and substantially undecomposed and chemically unchanged from the simple polymer prior to its solution.

The polyacrylonitrile for use with the invention is preferably prepared by the ammonium persulfate catalyzed polymerization of monomeric acrylonitrile dissolved or emulsified in water. It can, however, be prepared by any other suitable type of polymerization reaction such as, for example, the emulsion type reaction disclosed by U. S. Patent No. 2,160,054 to Bauer et al. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \frac{\text{viscosity of solution}}{\text{viscosity of solvent}} - 1$ and $C = $ concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. For example, polyacrylonitrile having a molecular weight of approximately 60,000 can be prepared as follows: To 94 pounds of distilled water heated to 40° C. add 40 grams of ammonium persulfate catalyst and 80 grams of sodium bisulfite activator. Then add 16 pounds of acrylonitrile slowly with stirring over a period of two hours. The polyacrylonitrile having the above said molecular weight will precipitate from the solution. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably having a molecular weight of 15,000 to 250,000 or higher can be prepared in a similar manner.

The following example illustrates a preferred method of preparing a solution of polyacrylonitrile in accordance with the principles of this invention. The invention is not to be limited by the details set forth in the example.

*Example I*

Ten (10) parts by weight of an acrylonitrile polymer prepared by the polymerization of monomeric acrylonitrile in accordance with the teachings of U. S. Patent No. 2,160,054 to Bauer et al. and possessing an average molecular weight of 120,000 are ground to an average particle size of 200 mesh and intimately mixed with 100 parts by weight of meta-phenylene diamine ground to a similar particle size. The mixture is heated over a period of thirty minutes to a temperature of 200° C. in a closed container, in the presence of nitrogen, to form a fluid, homogeneous mass or solution. The solution may be extruded through a 15-hole spinneret at a temperature of 200° C. into a glycerol bath heated to 115° C. to form a 15-filament yarn. A bath travel of 24 inches may be employed and the yarn subjected to a tension of 0.5 gram per denier (based on the final yarn denier) during its travel through the bath. The phenylene diamine is removed or leached from the yarn by the glycerol, thereby coagulating the polymer.

As above indicated, it is possible by the practice of this invention to obtain a solution of polyacrylonitrile, or a copolymer or interpolymer of acrylonitrile which may be used in the manufacture of shaped articles such as yarns, films or molded articles. These solutions are also suited for use as lacquers or coating compositions. They are especially useful in the coating of wire and electrical parts where the high chemical and electrical resistance of the polymer is important.

As also shown, the solvents of the invention are useful not only in connection with the polyacrylonitrile, but also with copolymers and interpolymers of acrylonitrile with other polymerizable substances such as, for example, compounds containing one or more ethylenic linkages including vinyl and acrylic compounds as well as olefinic or diolefinic hydrocarbons such as isobutylene, butadiene, etc. They are eminently satisfactory for use with those polymers that contain a large amount of acrylonitrile, for example polymers, or copolymers or interpolymers that contain at least 85% by weight of acrylonitrile and that have generally been regarded by the art as being completely insoluble in all common organic solvents. Nor are these solvents limited to use with a polyacrylonitrile of any given molecular weight. They can be used with a polymer of almost any given molecular weight and are especially satisfactory for use with those polymers having an average molecular weight within the range of 15,000 to 250,000 as determined by viscosity data using the Staudinger equation and intended for use in the manufacture of yarns or films.

The solution of acrylonitrile polymer dissolved in an organic solvent in accordance with this invention must be of such a concentration that its viscosity at the operating temperature is within a workable range. When it is to be employed in the spinning of yarn or the casting of film, the solution should preferably have a viscosity within the range of 25 to 750 poises. When the polymer has a molecular weight of 250,000 or more, this requires that the maximum concentration of polymer in the spinning solution be of the order of 10%. Generally, it is preferred that the spinning solution contain at least 10% of the polymer because of the difficulty of rapidly removing large amounts of solvent from the solution in the spinning operation. Moreover, it is economically undesirable to use such large amounts of solvent for the spinning of a given amount of polymer although it is true that the solvent can be completely recovered from the spinning operation and reused. For these reasons, it is preferred to employ a polymer having an average molecular weight of between 40,000 and 150,000 since such a polymer forms a solution of the desired viscosity in concentrations of the order of 15% to 25%, and at a desirable spinning temperature.

In employing the evaporation method of spinning filaments and yarns in accordance with this invention, it is preferred to spin under vacuum to avoid the use of unduly high temperatures.

Shaped articles of acrylonitrile polymer can also be formed by extruding the spinning solution into a suitable precipitating bath comprising a liquid that is miscible with the solvent but is a chemically inert non-solvent for the acrylonitrile polymer. As examples of such a liquid may be mentioned water, glycerin, organic solvents such as alcohol, ether, etc., or aqueous solutions of salts, alkalies or acids. The copending application of William W. Watkins Serial No. 496,376, filed July 28, 1943, covers the use of glycerol and aqueous solutions of salts or baths, preferably at elevated temperatures, for the wet spinning of acrylonitrile polymer yarn, from solutions of the polymer, preferably with substantial tension and stretch being applied during spinning.

The article of acrylonitrile polymer thus obtained can advantageously be subjected to a stretching operation of the type employed in the above examples. This stretching is preferably performed by passing the yarn between two positively driven rollers, the peripheral speeds of which are so adjusted that the article is stretched to from two to ten times its original length, preferably approximately six times its original length. This stretching of the formed article may be performed at any suitable time. However, in the case of articles formed by the wet spinning or casting technique, it is preferably performed before the article has been completely dried. The orientation of the structure thus obtained greatly improves the physical properties of the structure including its tenacity, its resilience, etc.

This stretching of the shaped article can also be accomplished by causing the article, while passing between stretching rollers, to contact a heated stationary pin, or to pass through an inert medium such as air, water, glycerin, etc., heated to a high temperature. Obviously, the article must not be exposed to this high temperature for a period sufficiently long to decompose the polymer. In general however, the time of contact of the article with the heated medium is so short that temperatures up to 250° C. can be employed. It is generally preferred to heat the article to a temperature of at least 100° C. during the stretching operation. The stretching of acrylonitrile polymer, particularly under the influence of heat, is described and claimed in the copending application of Daniel T. Meloon Serial No. 496,397, filed July 28, 1943.

In addition to acting as solvents for polyacrylonitrile, or copolymers or interpolymers of acrylonitrile, the aromatic compounds of this invention, when present in small amounts, can also be used as plasticizing agents for the polymer and the higher boiling compounds of the invention are especially suited for such use. At the same time, it is, of course, to be understood that non-solvent softeners such as glycerol, etc. can also be incorporated in the solutions of this invention, these materials remaining in the subsequently formed articles to impart a softening effect. If it is desired to use such plasticizing or softening agents with polyacrylonitrile, they are preferably added in the desired amount to an already formed solution of the polymer in a lower boiling solvent.

This invention is primarily concerned with the steps of dissolving polyacrylonitrile in a suitable solvent to form a stable solution adapted for use in the manufacture of shaped articles of polyacrylonitrile. It is characteristic of the invention that the solvents do not cause a decomposition or chemical alteration of the dissolved acrylonitrile polymer. At the same time, it is also characteristic that the solvents provided by the invention are also useful in the dissolving of mixtures of polyacrylonitrile and adjuvants such as dye modifiers, linear polyamides such as nylon, derivatives of cellulose including cellulose ethers and esters, polymers of vinyl compounds such as vinyl chloride, vinyl acetate, acrylic acid, etc., which adjuvants may be incorporated in the acrylonitrile polymer solution to modify the properties, both chemical and physical, of the resulting shaped articles.

This invention provides a class of solvents for polyacrylonitrile and copolymers and interpolymers of acrylonitrile, i. e. compounds which, when liquid, will form molecular dispersions containing an appreciable amount, e. g. 5% or more by weight of the polymer. The invention also provides a class of materials that is eminently suited for use in plasticizing structures comprising the acrylonitrile polymers. The materials provided by this invention are apparently true solvents for the above-mentioned acrylonitrile polymers. They do not tend to react with or decompose the polymer, the polymeric material obtained from the solution of this invention apparently being of the same identical chemical composition as the initial polymer.

Reference, throughout the specification and claims, to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group

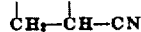

that is, at least 85% by weight of the reactant material converted into and forming the polymer is acrylonitrile.

Since it is obvious that many changes and modifications can be made in the above described details without departing from the nature and spirit of the invention, it is to be understood that the invention is not to be limited to the details described herein except as set forth in the appended claims.

I claim:

1. As a new composition of matter, a polymer of acrylonitrile containing in the polymer molecule at least 85% by weight of acrylonitrile dissolved in an aromatic compound taken from the group consisting of:

Ortho phenylene diamine
Meta phenylene diamine
Para phenylene diamine
2,2',4,4'-tetramino 5,5'-dimethyl diphenyl methane
4,4'-diamino benzophenone
2,6-diamino pyridine
2,4,6-triamino toluene.

2. A new composition of matter as defined in claim 1, in which said polymer is polyacrylonitrile.

3. A new composition of matter as defined in claim 1, in which said polymer of acrylonitrile is nonreactive with said aromatic compound.

4. A new composition of matter as defined in claim 1, in which said polymer has a molecular weight of between 15,000 and 250,000.

5. A new composition of matter as defined in claim 1, in which said polymer has a molecular weight of between 40,000 and 150,000.

6. As a new composition of matter, a polymer of acrylonitrile containing in the polymer molecule at least 85% by weight of acrylonitrile and an aromatic compound taken from the group consisting of:

Ortho phenylene diamine
Meta phenylene diamine
Para phenylene diamine
2,2',4,4'-tetramino 5,5'-dimethyl diphenyl methane
4,4'-diamino benzophenone
2,6-diamino pyridine
2,4,6-triamino toluene.

7. The composition of claim 1 in which the solution contains at least 10% of said polymer of acrylonitrile.

8. The composition of claim 1 in which the solution has a viscosity within the range 25 to 750 poises.

9. The composition of claim 1 in which the polymer is polyacrylonitrile having a molecular weight of between 15,000 and 250,000.

10. The composition of claim 1 in which the polymer is polyacrylonitrile having a molecular weight of between 40,000 and 150,000.

RAY CLYDE HOUTZ.

Certificate of Correction

Patent No. 2,404,720.     July 23, 1946.

RAY CLYDE HOUTZ

It is hereby certified that error appears in the printed specification of the above numbered patent requiring correction as follows: Column 6, line 14, for "or" read *as*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.* acrylonitrile. It is characteristic of the invention that the solvents do not cause a decomposition or chemical alteration of the dissolved acrylonitrile polymer. At the same time, it is also characteristic that the solvents provided by the invention are also useful in the dissolving of mixtures of polyacrylonitrile and adjuvants such as dye modifiers, linear polyamides such as nylon, derivatives of cellulose including cellulose ethers and esters, polymers of vinyl compounds such as vinyl chloride, vinyl acetate, acrylic acid, etc., which adjuvants may be incorporated in the acrylonitrile polymer solution to modify the properties, both chemical and physical, of the resulting shaped articles.

This invention provides a class of solvents for polyacrylonitrile and copolymers and interpolymers of acrylonitrile, i. e. compounds which, when liquid, will form molecular dispersions containing an appreciable amount, e. g. 5% or more by weight of the polymer. The invention also provides a class of materials that is eminently suited for use in plasticizing structures comprising the acrylonitrile polymers. The materials provided by this invention are apparently true solvents for the above-mentioned acrylonitrile polymers. They do not tend to react with or decompose the polymer, the polymeric material obtained from the solution of this invention apparently being of the same identical chemical composition as the initial polymer.

Reference, throughout the specification and claims, to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group

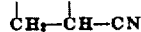

that is, at least 85% by weight of the reactant material converted into and forming the polymer is acrylonitrile.

Since it is obvious that many changes and modifications can be made in the above described details without departing from the nature and spirit of the invention, it is to be understood that the invention is not to be limited to the details described herein except as set forth in the appended claims.

I claim:

1. As a new composition of matter, a polymer of acrylonitrile containing in the polymer molecule at least 85% by weight of acrylonitrile dissolved in an aromatic compound taken from the group consisting of:

Ortho phenylene diamine
Meta phenylene diamine
Para phenylene diamine
2,2',4,4'-tetramino 5,5'-dimethyl diphenyl methane
4,4'-diamino benzophenone
2,6-diamino pyridine
2,4,6-triamino toluene.

2. A new composition of matter as defined in claim 1, in which said polymer is polyacrylonitrile.

3. A new composition of matter as defined in claim 1, in which said polymer of acrylonitrile is nonreactive with said aromatic compound.

4. A new composition of matter as defined in claim 1, in which said polymer has a molecular weight of between 15,000 and 250,000.

5. A new composition of matter as defined in claim 1, in which said polymer has a molecular weight of between 40,000 and 150,000.

6. As a new composition of matter, a polymer of acrylonitrile containing in the polymer molecule at least 85% by weight of acrylonitrile and an aromatic compound taken from the group consisting of:

Ortho phenylene diamine
Meta phenylene diamine
Para phenylene diamine
2,2',4,4'-tetramino 5,5'-dimethyl diphenyl methane
4,4'-diamino benzophenone
2,6-diamino pyridine
2,4,6-triamino toluene.

7. The composition of claim 1 in which the solution contains at least 10% of said polymer of acrylonitrile.

8. The composition of claim 1 in which the solution has a viscosity within the range 25 to 750 poises.

9. The composition of claim 1 in which the polymer is polyacrylonitrile having a molecular weight of between 15,000 and 250,000.

10. The composition of claim 1 in which the polymer is polyacrylonitrile having a molecular weight of between 40,000 and 150,000.

RAY CLYDE HOUTZ.

---

Certificate of Correction

Patent No. 2,404,720.                              July 23, 1946.

RAY CLYDE HOUTZ

It is hereby certified that error appears in the printed specification of the above numbered patent requiring correction as follows: Column 6, line 14, for "or" read *as*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.*